United States Patent [19]
Horst

[11] 3,798,975
[45] Mar. 26, 1974

[54] MEASURER
[76] Inventor: Patricia J. Horst, c/o Innovations, Inc., 2903 Spring Creek Rd., Rockford, Ill. 61107
[22] Filed: Sept. 13, 1972
[21] Appl. No.: 288,759

[52] U.S. Cl. .............................................. 73/429
[51] Int. Cl. ......................................... G01f 19/00
[58] Field of Search ..................................... 73/429

[56] References Cited
UNITED STATES PATENTS
3,690,182  9/1972  Rodriguez ............................ 73/429
2,496,268  2/1950  Chester ................................ 73/429

Primary Examiner—Donald O. Woodiel
Attorney, Agent, or Firm—Wolfe, Hubbard, Leydig, Voit & Osann, Ltd.

[57] ABSTRACT

A measurer includes an elongated body with a depending flap connected to one end thereof and a slide mounted on the body defines a measuring chamber between the end of the slide and the flap. By moving the slide to adjust the distance between the flap and the end of the slide, the size of the chamber may be changed as desired.

1 Claim, 4 Drawing Figures

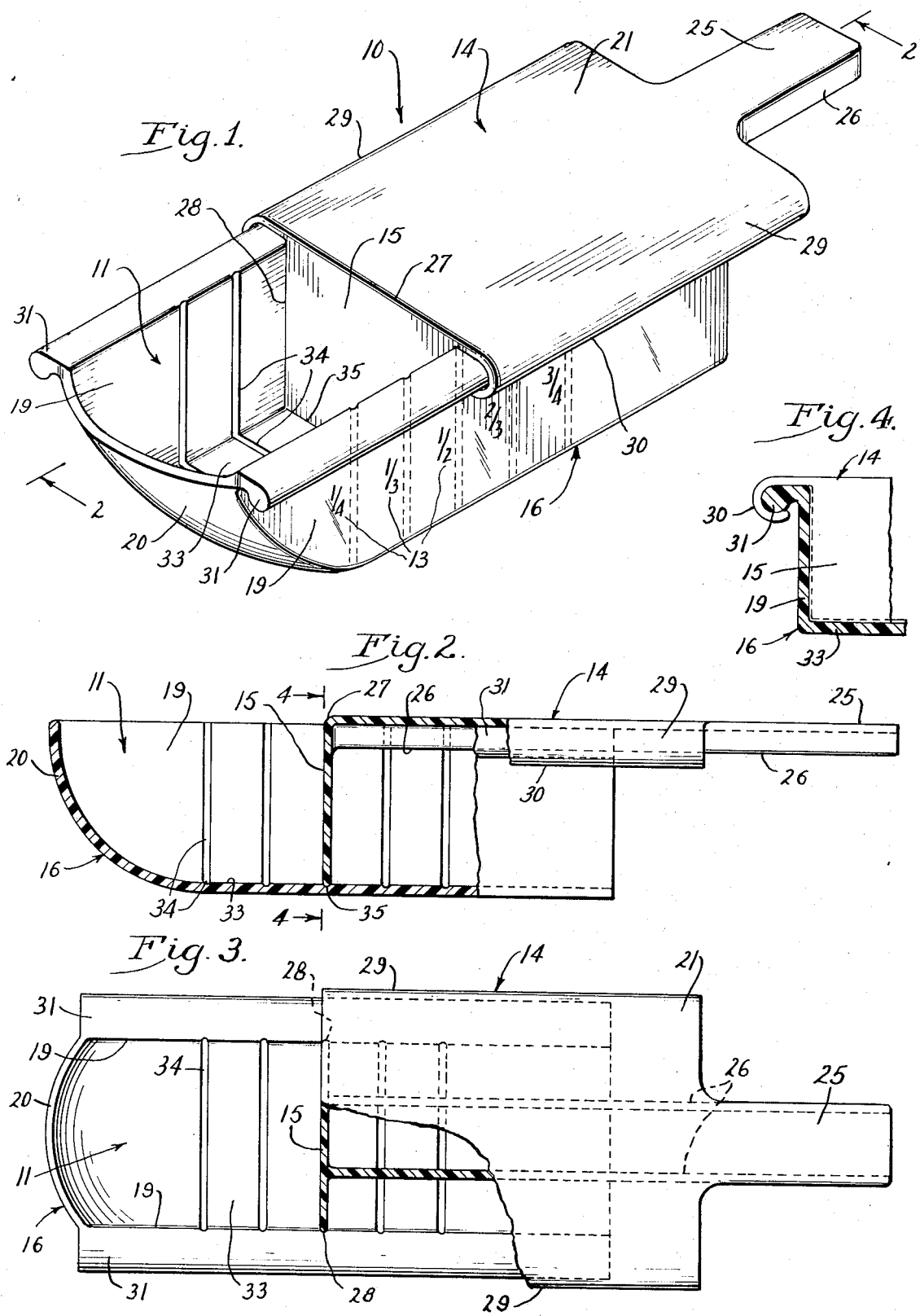

3,798,975

MEASURER

BACKGROUND OF THE INVENTION

This invention relates to a measurer of the type used in cooking to measure out the ingredients for a recipe. More particularly, the invention relates to the type of measurer which includes a measuring chamber with graduations to indicate the amount of ingredient being measured.

SUMMARY OF THE INVENTION

The primary object of the present invention is to provide a unique measurer which includes the advantages of both a graduated measurer such as is used to measure different quantities of ingredients as indicated by the graduations and a set of measurers of different sizes, each for measuring one specific amount of ingredient. A more detailed object is to accomplish the foregoing by the unique provision in the measurer of an adjustable measuring chamber whose size may be changed selectively according to the amount of ingredient desired to be measured.

The invention also resides in the unique construction of the measurer enabling both liquid and dry ingredients to be measured in the chamber and in the novel manner in which parts interfit and are movable relative to each other to define the adjustable measuring chamber.

These and other objects and advantages of the present invention will become more apparent from the following detailed description when taken in conjunction with the accompanying drawings.

BRIEF DESCRIPTION OF THE DRAWINGS

FIG. 1 is a perspective view of a measurer embodying the novel features of the present invention.

FIG. 2 is a partial cross-sectional view taken substantially along line 2—2 of FIG. 1.

FIG. 3 is a plan view with parts broken away and shown in cross-section.

FIG. 4 is an enlarged fragmentary cross-sectional view taken substantially along line 4—4 of FIG. 2.

DETAILED DESCRIPTION OF THE PREFERRED EMBODIMENT

As shown in the drawings for purposes of illustration, the present invention is embodied in a measurer 10 such as is used in cooking to measure ingredients for a recipe or by dieters in portioning out food. Herein, the measurer includes a measuring chamber 11 for measuring the amount of ingredient and a plurality of markings 13 on the side of the measurer are used to indicate the amount of food or ingredient being measured.

In accordance with the primary aspect of the present invention, provision is made for adjusting the measuring chamber 11 between a plurality of different sizes for measuring different quantities of ingredients by completely filling the chamber instead of partially filling the chamber by pouring the ingredient to a particular graduation level as for other graduated measurers. For these purposes, the measurer includes a body member 14 with an upright wall or flap 15 formed at one end thereof and a generally U-shaped slide member 16 mounted on the body and having one end portion thereof projecting beyond the end of the body. The flap fits between the sides 19 of the slide intermediate its ends and is spaced from a panel 20 across the end of the slide to define the measuring chamber 11. With this arrangement, as the slide is moved to vary the length of the projecting end portion, the end panel moves relative to the flap whereby the length and, as a result, the size of the chamber is changed. Accordingly, by moving the slide relative to the body, the chamber can be adjusted easily and quickly so that the same measurer can be used to measure a number of different amounts simply by completely filling the measuring chamber after selecting the desired chamber size.

In the present instance, the body 14 is formed as a generally rectangular member 21 (see FIGS. 1 and 3) having a handle 25 extending rearwardly from one end thereof. More particularly, the body may be formed of metal, plastic or wood and includes two parallel braces 26 (see FIG. 3) which extend from the free end of the handle to the opposite end of the body to provide support both for the body and the handle. The flap 15 is of a predetermined size and shape and depends vertically from the end of the body opposite the handle, being integrally connected to the body along a front edge 27. As shown in FIGS. 2 and 3, the braces also are connected integrally with the back side of the flap and thus keep the upper end of the flap fairly rigid while still allowing the lower end portion of the flap to flex somewhat as the slide 16 is adjusted relative to the body for different sizes of chambers 11.

To hold the slide 16 on the body 14, opposite side margins 29 extend outwardly beyond the vertical side edges 28 of the flap (see FIG. 1) and both margins are turned downwardly and inwardly so that each forms an elongated curl 30 and extends along one side of the member 21. Along the upper edges of the sides 19 of the slide are two beads 31, one bead being formed along each edge and turned outwardly thereof and each bead being sized to fit within one of the curls. Accordingly, the measurer is assembled simply by telescoping the beads into the curls whereby the curls support the slide on the body (see FIG. 4).

As shown in FIG. 1, the slide 16 has a generally U-shaped cross-sectional configuration defined by the opposite sides 19 and a bottom panel 33. More particularly, the sides and bottom panel enclose an area which is virtually the same shape as the flap 15 but is slightly smaller in size. The end panel 20 connects integrally with the side and bottom panels curving upwardly and outwardly from the bottom panel as well as forwardly between the two side panels to form a scoop closing the outer end of the slide. The other or inner end of the slide remains open to facilitate assembly of the slide with the body and disassembly for cleaning purposes. The measuring chamber 11 is defined by the space in the slide bounded by the flap, the side panels, the bottom panel and the end panel.

To adjust the size of the measuring chamber 11, the slide 16 may be moved selectively relative to the body 14 until the size of the space in the slide between the flap 15 and the end panel 20 equals the volume desired to be measured out. Advantageously, the measurer is adapted for use in measuring both liquid and dry ingredients by virtue of a liquid-tight fit between the flap and the slide so that the measuring chamber is sealed to prevent leakage of liquid ingredients. Preferably, but not necessarily, this is accomplished by means of a plurality of grooves 34 which extend across the interior surfaces of the side and bottom panels 19 and 33. Because the flap is slightly larger than the cross-sectional area defined by sides and bottom panels of the slide, the free side edges 28 and bottom edge 35 of the flap snap fit within the grooves (see FIGS. 2 and 3) with a tight fit so to prevent liquid from leaking between the flap and the slide. This tight fit also has the advantage of releasably locking the slide against slipping out of the selected measuring position.

Another advantageous feature of the present invention contemplates the construction of the slide 16 of transparent plastic material. With this construction, the grooves 34 are visible through the sides 19 of the slide and thus serve as graduations marking various sizes for the measuring chamber 11. In addition, the marks 13 on the outside of the sides of the slide adjacent the grooves indicate the sizes (such as ⅛, ¼, ⅓ cup, etc.) for the measuring chamber.

In view of the foregoing, it will be seen that the present invention brings to the art a new and improved measurer 10 which incorporates the advantages of both a single volume measurer and a graduated measurer by reason of the provision of the adjustable measuring chamber 11. Also, by providing a liquid-tight fit between the flap 15 and the slide 16, the measuring chamber is sealed against leaks so that both liquids and solids may be measured.

I claim as my invention:

1. A measurer including an elongated body having a flap of predetermined size and shape integrally formed with and depending from one end thereof, a slide mounted on said body for movement between selected measuring positions, said slide having two generally upright sides spaced from each other, a bottom wall extending between said sides and a panel extending upwardly from said bottom wall and between said sides to close one end of the slide, said slide having a U-shaped cross-sectional area substantially the same size and shape of said flap, the latter being telescoped downwardly between said sides and intermediate the ends of the slide so as to define a measuring chamber within said slide between the flap and the panel, said measuring chamber being adjustable in size by moving the slide on the body so the flap moves broadwise relative to the panel to vary the distance therebetween, and a plurality of longitudinally spaced grooves formed laterally across the inside surfaces of said bottom wall and said sides to define the measuring positions of said slide on said body, said flap being received within one of said grooves with a snap fit when said slide is moved selectively into one of the measuring positions to releasably lock said slide against slipping out of the selected one of said measuring positions while also forming a liquid tight seal between said flap and said slide.

* * * * *